United States Patent

Overbeek et al.

[11] Patent Number: 5,981,642
[45] Date of Patent: Nov. 9, 1999

[54] METHOD OF GRAFTING

[75] Inventors: Gerardus Cornelis Overbeek, Waalwijk, Netherlands; Alison Dawn Bedells, Whalley Range; John Christopher Padget, Frodsham, both of United Kingdom

[73] Assignee: Zeneca Limited, London, United Kingdom

[21] Appl. No.: 08/849,907

[22] PCT Filed: Dec. 19, 1995

[86] PCT No.: PCT/EP95/05021

§ 371 Date: Aug. 5, 1997

§ 102(e) Date: Aug. 5, 1997

[87] PCT Pub. No.: WO96/19512

PCT Pub. Date: Jun. 27, 1996

[30] Foreign Application Priority Data

Dec. 21, 1994 [GB] United Kingdom .................. 9426048
Aug. 1, 1995 [GB] United Kingdom .................. 9515719

[51] Int. Cl.$^6$ .................. C08J 3/02; C08K 3/20; C08L 9/04; C08L 9/08
[52] U.S. Cl. .................. 524/457; 524/458; 524/460; 524/500; 524/502; 525/193; 525/263; 525/329.5; 525/329.7; 525/387
[58] Field of Search .................. 524/458, 460, 524/457, 500, 502; 525/193, 263, 329.5, 329.7, 387

[56] References Cited

U.S. PATENT DOCUMENTS

| 4,151,143 | 4/1979 | Blank et al. . |
| 4,894,397 | 1/1990 | Morgan et al. ........................ 523/201 |
| 4,954,448 | 9/1990 | Wiegand et al. ...................... 435/232 |
| 4,954,558 | 9/1990 | Tsaur ................................... 525/460 |

FOREIGN PATENT DOCUMENTS

| 2 066 988 | 10/1992 | Canada . |
| 0 261 942 | 3/1988 | European Pat. Off. .......... C08F 2/38 |
| 0 338 486 | 10/1989 | European Pat. Off. ...... C08F 291/00 |
| 511 520 | 11/1992 | European Pat. Off. . |
| 2 254 082 | 9/1992 | United Kingdom . |
| WO 95/04767 | 2/1995 | WIPO ........................ C08F 265/02 |
| WO 95/29944 | 11/1995 | WIPO ........................ C08F 265/04 |
| WO 95/29963 | 11/1995 | WIPO ........................ C09D 151/00 |

*Primary Examiner*—Patrick D. Niland
*Attorney, Agent, or Firm*—Pillsbury Madison & Sutro, LLP

[57] ABSTRACT

Method of grafting a water-soluble organic oligomer(s) to an organic polymer(s) in aqueous latex form, which method comprises forming a water-based mixture of a water-soluble oligomer(s), an aqueous latex of a polymer(s), and at least one free radical polymerisable monomer, both of said oligomer(s) and polymer(s) being preformed, and carrying out free radical polymerisation of said at least one monomer to effect grafting between said oligomer(s) and said polymer (s).

58 Claims, No Drawings

METHOD OF GRAFTING

The present invention relates to a method of grafting an oligomer to a polymer in latex form, and to an aqueous latex of an oligomer-grafted polymer where grafting has been effected using such a method.

The use of aqueous emulsions of organic polymers, commonly known as aqueous polymer latices, is well known in the art for numerous applications, and in particular for the provision of the binder material in various coatings and adhesives applications.

It is known for some applications to be advantageous to employ an aqueous emulsion of a polymer system which comprises a hydrophilic oligomer and an emulsion polymer which is (often) hydrophobic in nature, the hydrophilic polymer being (often) solubilised is in the aqueous medium. In some cases, the polymer system is produced by a sequential polymerisation process, examples of which are described in patent publications such as U.S. Pat. No. 4,894,397, U.S. Pat. No. 4,954,558 and WO 95/04767.

Such latices may provide improvements in mechanical, physical or other performance properties in comparison to more conventional emulsion polymers.

It is, moreover, also known that it is often advantageous for the oligomer and polymer components of the latex to be intimately associated, and in particular to be grafted or at least strongly physically bound (e.g. by adsorption) to one another. This often achieves desirable improvements such as: greater latex stability in various applications, conditions, or formulations; avoiding problems of unwanted reactions or effects of the free oligomeric component with other materials which might occur in certain formulations; and the provision of desired rheological effects.

It is of course known that grafting or strong physical association may in fact take place to a certain degree when the polymer system is made sequentially (i.e. when the polymerisation to form the emulsion polymer is carried out in the presence of the oligomer or vice versa), particularly if the oligomeric material is unsaturated, as in the use e.g. of an unsaturated oligomeric polyester or an addition oligomer made using free radical polymerisation in the presence of a cobalt chelate catalyst as a molecular weight control material which often results in a proportion of terminal unsaturation in the resulting oligomer (see later).

However, the use of sequential polymerisation process to form the grafted oligomer/emulsion polymer combination does have certain disadvantages.

Thus, there is a certain loss of freedom to control various parameters and components when making the oligomer and emulsion polymer in a sequential operation such as the choice of initiator types, amount of initiator, emulsifier types and amounts, and type of monomers used, since one must be mindful of the effect thereof on the subsequent polymerisation (which could be a detrimental one). It is also necessary to employ a carefully controlled polymerisation set-up when making the second-formed polymer (usually emulsion polymer) whereas, ideally, one would often prefer to use an already existing polymer (e.g available commercially, or otherwise ready to hand). Further still, the use of a sequential process tends to result in a relatively small particle size for an emulsion polymer formed in the presence of oligomer, since the latter in many respects itself acts as an emulsifier (becoming adsorbed on the surface of the growing polymer particles and hence limiting their size); ideally one would prefer the choice of using an emulsion polymer with a very wide range of average particle size. Yet further, it may be necessary to carefully control the amount of oligomer present in the subsequent polymerisation process to form emulsion polymer, since in some cases the use of above a certain oligomer concentration may encourage flocculation or coagulation in the polymerising reaction medium.

Apart from all the foregoing, in our experience the use of the sequential polymerisation technique to achieve grafting in aqueous polymer systems is sometimes rather inefficient and in some cases may only occur to a low degree, if at all.

In order to avoid disadvantages such as those discussed above, our attention has turned to employing preformed oligomer and preformed emulsion polymer components and attempting to effect a grafting reaction between them. Of course, if one carries out simple blending or admixture of the preformed components, no grafting or strong physical association at all is likely to exist, even if the oligomer possesses an unsaturated group(s). Yet further, in our experience, simply trying to effect a grafting reaction between an unsaturated oligomer and a latex polymer by subjecting the two to free-radical polymerising conditions does not usually achieve any significant grafting or associative effect.

We have now discovered a method of grafting (or strongly physically associating) a preformed oligomer to a preformed polymer in an aqueous system which is highly efficient and avoids the above-discussed disadvantages when using a sequential technique to form a grafted polymer system.

According to the present invention there is provided a method of grafting a water-soluble organic oligomer(s) to an organic polymer(s) which is in aqueous latex form, which method comprises forming a water-based mixture of a water-soluble oligomer(s), an aqueous latex of a polymer(s), and at least one free radical polymerisable monomer, both of said oligomer(s) and polymer(s) being preformed, and carrying out free radical polymerisation of said at least one monomer to effect grafting between said oligomer(s) and said polymer(s).

There is further provided according to the invention an aqueous polymer latex composition comprising a water-soluble oligomer(s) grafted to a latex polymer(s), wherein said grafting has been effected by the method as defined supra.

By "water-based" is meant that the components are carried in a liquid carrier medium of which water is the principal component. Preferably at least 50 weight %, more preferably at least 80 weight %, of the liquid carrier medium is water; however minor amounts of organic liquids may optionally be present.

In this specification the term "grafting" as used in the invention process is intended to embrace not only true chemical bonding but also strong physical association which may exist (e.g by adsorption of the reaction product of the oligomer and added monomer(s) on to the emulsion polymer particles), and of course includes a combination of both. We have in fact found it difficult to detect or quantify the difference between true grafting and strong physical association in the context of the polymer system resulting from the invention process, using separation techniques conventionally employed when determining graft content. The resulting polymer latex is nevertheless possessed of significantly improved properties as mentioned above, and the process itself has useful advantages.

Thus, for example, it is possible to employ any existing polymer latex (e.g available commercially) for the invention process, and it is not necessary to especially prepare a polymer latex therefor—although this can be done if desired. Another advantage is that the extent of grafting between the polymer latex particles and the water-soluble oligomer can be controlled by variation of readily accessible and/or changeable parameters, such as the choice of initiator type, concentration of initiator, type and amount of stabilising compound, type of added monomer, oligomer type and concentration of oligomer and feed profile variation for initiator as well as monomer.

A further advantage is that the resulting polymer latex composition responds to the addition of an associative thickener where the requirement is to form a thickened latex (for use in paint compositions for example), in contrast to what happens when an unsaturated oligomer is in simple admixture with a polymer latex, whereupon (in our experience) the water-soluble oligomer destroys the mode of action of the latex with the thickener, i.e. no appreciable thickening is found to occur.

Another advantage is that the resulting polymer latex composition may provide film coatings of improved properties (e.g. improved compatibility, or improved solvent resistance, especially when crosslinkable—see later), in comparison to a simple blend based on the same oligomer and polymer latex in the same relative amounts.

A still further advantage is that the resulting polymer latex composition has desirably modified rheological properties, e.g increased open time. It may also have improved wet adhesion if the oligomer contains an appropriate adhesion promoting comonomer.

Yet further the process can be applied for effectively grafting water soluble oligomers to polymer latices which have a very liberal variation of average particle size, e.g. polymer latices of large particles as well as ones of low or intermediate average particle size.

Further still the invention aqueous polymer composition may have improved stability to sedimentation and a lower residual monomer content in comparison to a corresponding product made using a sequential (in-situ) polymerisation procedure.

The oligomer/polymer system for use in the invention process is expressly not made by a sequential polymerisation technique but instead one uses a blend or admixture of the preformed oligomer and the preformed polymer. Moreover the hydrophilic oligomer should be water-soluble and indeed is preferably in aqueous solution prior to commencement of the free-radical polymerisation of monomer according to the invention process.

By an aqueous solution of the oligomer as mentioned above is usually meant herein that the oligomer is completely or substantially completely dissolved in the aqueous medium prior to grafting so that it is present as a true solution. However the term also extends, less usually, to the oligomer existing as a dispersion in the aqueous medium (the term "water-soluble" being similarly construed). In such a case the polymer dispersion is in particular a colloidal dispersion of the polymer particles (as in a polymer latex or emulsion). Sometimes, of course, the distinction between colloidal dispersions and true solutions is difficult to distinguish, a situation intermediate these states existing; or some of the polymer could be dispersed in the aqueous medium and some could be dissolved. Thus the term "aqueous solution" is also intended in some cases to embrace a disposition of the oligomer in an aqueous medium which corresponds to such intermediate states.

Preferably the necessary hydrophilicity of the oligomer (for imparting water-solubility) is provided or contributed to by virtue of the presence of acid functional groups borne by the oligomer molecules, which render (or assist in rendering) the oligomer water-soluble per se or by neutralisation. Thus the oligomer preferably contains a sufficient concentration of acid functionality to render it partially or more preferably fully soluble in aqueous media, if necessary by neutralisation of acid groups of the polymer, as would e.g. be achieved by adjustment of the pH of the aqueous medium. (If the acid-functional oligomer had only sufficient acid functionality to render it partially soluble in an aqueous medium, it could exist as a colloidal dispersion (preferably of z average particle size not more than 30 nm), or intermediate between a colloidal dispersion and a true solution or could be partly dispersed and partly dissolved). (z average particle size, as is well known, is equal to $\Sigma n_i d_i^3 / \Sigma n_i d_i^2$ where $d_i$ in the diameter of particles i and $n_i$ is the number of particles of diameter i). Sometimes, the aqueous medium in which the oligomer finds itself will be acidic (pH<7) and the acid groups will be carboxyl groups so that dissolution will be effected by raising the pH of the medium (this e.g could be the aqueous polymerisation medium in which the oligomer has been prepared) so as to neutralise the acid groups to form carboxylate anions by the addition of a base, such as an organic or inorganic base, examples of which include organic amines such as trialkylamines (e.g triethylamine, tributylamine), morpholine and alkanolamines, and inorganic bases such as ammonia, NaOH, KOH, and LiOH. Of course, the aqueous medium containing the acid functional oligomer may already be alkaline (or sufficiently alkaline) such that the acid groups (such as carboxyl groups) become neutralised without the requirement for positively adding a base to raise pH, or the acid groups may be or include very strong acid groups such as sulphonic acid groups (pK 1 to 2) so that neutralisation may not be necessary to achieve dissolution. Further still, it is possible for acid monomers to be polymerised in salt form rather than as the free acid.

The oligomer could also be hydrophilic by virtue of carrying nonionic dispersing groups, such as groups comprising polyethylene oxide chains. These could alternatively provide, or at any rate significantly contribute to, the water solubility of the oligomer.

The aqueous emulsion polymer used in the invention process is most preferably a hydrophobic emulsion polymer, this type of polymer being well understood by those skilled in the art. Generally speaking it may be considered herein as a water-insoluble polymer whose water-insolubility is maintained throughout the pH range. The hydrophobic nature of the polymer is achieved by virtue of the polymer containing a sufficient concentration of at least one hydrophobic monomer (i.e. in polymerised form) to render the polymer water-insoluble throughout the pH range. Thus, most preferably, the emulsion polymer employed in the invention process is insoluble in the aqueous medium of that polymerisation process regardless of any adjustments in pH to which the medium could be subjected.

When carrying out the process of the invention, the preformed oligomeric and polymeric materials, and monomer(s) to be polymerised, are simply admixed. Any order of mixing is possible in principal, but it is preferred to add the preformed oligomer and monomer(s) to be polymerised (possibly themselves being in admixture) to the latex polymer(s) and then polymerising. Where neutralisation of the oligomer is required to achieve water-solubility, this may be effected prior to or during adding it to the emulsion polymer or subsequent to such addition.

It will normally be necessary, and usually always desirable, to incorporate a suitable free radical-yielding initiator(s) with the oligomer/latex polymer/monomer combination, although it may sometimes be possible (if not preferred) to utilise only initiator that remains from the polymerisation to form the emulsion polymer and/or the oligomer.

The water-soluble oligomer may be of any suitable polymer type of low molecular weight, e.g. it may be a low molecular weight polyester, polyurethane (this term including herein a polyesterurethane, formed e.g. by employing a polyesterpolyol with terminal OH groups as an isocyanate-reactive component in a urethane synthesis), polyamide, or an olefinic polymer (i.e. made by polymerising at least one olefinically unsaturated monomer) such as a low molecular weight acrylic polymer. Preferably the oligomer is a low molecular weight polyester or olefinic polymer; most preferably it is an olefinic polymer.

The oligomer can be combined with the polymer latex in various ways—e.g in the form of an isolated solid from aqueous emulsion, aqueous suspension or organic solution polymerisation (with subsequent basification if necessary in the case of an acid functional oligomer), in aqueous solution, aqueous emulsion or aqueous suspension (i.e. without isolating the solid oligomer and with subsequent basification if necessary to achieve water-solubilisation), in water-miscible and/or water immiscible organic solvent solution (again with subsequent basification if necessary to achieve water solubilisation and eventually preferable removal of at least part of this organic solvent). Preferably, the oligomer is used in the form of an aqueous solution, this being admixed with the polymer emulsion (usually in combination with monomer(s) to be polymerised).

In the case of using an aqueous oligomer solution, the isolated solid oligomer may be added to water and solubilised if necessary using an appropriate base (assuming the oligomer is acid functional) which has been introduced to the water prior to, during, or subsequent to the addition of oligomer. Another method is to form an aqueous solution directly by aqueous solution polymerisation.

More usually, however, an aqueous oligomer solution is made by aqueous emulsion or suspension polymerisation of olefinically unsaturated monomer(s), at least one being acid-functional, to form an aqueous latex or suspension, followed by neutralisation with a base to effect water-solubilisation of the emulsion or suspension polymer thereof.

As mentioned supra, the oligomer is preferably unsaturated, such unsaturation providing one or more radically polymerisable double bonds. This is usually achieved by employing an appropriate unsaturated monomer as part of the monomer system used for making the oligomer, e.g. by using an unsaturated acid or polyol as part of the acid or hydroxyl component (such as maleic or fumaric acid) in the case of a polyester oligomer, or using an olefinic monomer with at least two unsaturated double bonds (e.g. allyl (meth) acrylate or the various dienes), or an unsaturated chain transfer agent such as a mercaptoolefine, in the case of olefinic oligomer.

More preferably, however, oligomer unsaturation is provided by employing certain cobalt chelate complexes as molecular weight control agents in free radical polymerisations to form olefinic oligomers, whereby a proportion (which can be up to 100%) of the resulting oligomer molecules have terminal unsaturation (see later).

As mentioned above, the oligomer used in the invention process is most preferably an olefinic oligomer having acid functionality for imparting water-solubility, and is also preferably one formed using an aqueous emulsion or suspension polymerisation process to form an aqueous polymer emulsion (latex) or aqueous polymer suspension—which is subsequently basified if necessary to achieve dissolution of the oligomer in the aqueous medium (as discussed supra). Such aqueous emulsion and suspension polymerisation techniques are in their basic format extremely well known and need not be described in great detail. Suffice to say that such processes involve dispersing the monomer(s) in an aqueous medium and conducting polymerisation using a free-radical initiator (often water soluble in the case of emulsion polymerisation, and often monomer soluble in the case of suspension polymerisation) and (usually) appropriate heating (e.g. 30 to 120° C., more usually 40 to 90° C.) and agitation (stirring) being employed. An aqueous emulsion polymerisation can be effected with conventional emulsifying agents (surfactants) usually being used [e.g. anionic and/or non-ionic emulsifiers such as Na, K and $NH_4$ salts of dialkylsulphosuccinates, Na, K and $NH_4$ salts of sulphated oils, Na, K and $NH_4$ salts of alkyl sulphonic acids, Na, K and $NH_4$ alkyl sulphates such as Na lauryl sulphate, alkali metal salts of sulphonic acids. $C_{12-24}$ fatty alcohols, ethoxylated fatty acids and/or fatty amides, and Na, K and $NH_4$ salts of fatty acids such as Na stearate and Na oleate; aryl-containing analogues of the alkyl-containing surfactants are also useful; other surfactants include phosphates and cationic compounds such as hexadecyltrimethyl ammonium bromide. The amount used can be 0 to 15% by weight, and if present usually 0.2 to 15% by weight, more usually 0.3 to 5% (0.3 to 2%) by weight based on the weight of total monomer(s) charged. In the case of aqueous suspension polymerisation, protective colloids are usually employed as stabilisers examples of which include partially hydrolysed polyvinyl acetate (varying degrees of hydrolysis), cellulose derivatives, polyvinyl pyrollidone, and polyacrylic acid. The amount used is usually 0.05 to 7%, more usually 0.05 to 3%, calculated on monomer weight. Salts such as $Na_2SO_4$ can be included for reducing monomer solubility in the aqueous phase and to improve stabilisation. The polymerisations can employ conventional free radical initiators, examples of which (particularly for emulsion polymerisation) include hydrogen peroxide, t-butyl hydroperoxide, cumene hydroperoxide, persulphates such as $NH_4$ persulphate, K persulphate and Na persulphate; redox systems such as $NH_4$ persulphate and Na metabisulphite may be used; combinations such as t-butyl hydroperoxide, isoascorbic acid and Fe EDTA are useful; other examples include (particularly for suspension polymerisation) azo compounds such as 2,2'-azobis(isobutyronitrile), 2,2-azobis-(2-methyl)butanenitrile, 4,4'-azobis(4-cyanovaleric acid), 2-(t-butylazo)-2-cyanopropane, 2,2'-azobis[2-methyl-N-(1,1)-bis(hydroxymethyl)-2-hydroxyethyl]-propionamide and 2,2'-azobis[2-methyl-N-hydroxyethyl)]-propionamide. Peroxy compounds such as benzoyl peroxide and lauryl peroxide could also be used. The amount of initiator, or initiator system in such polymerisations, is generally 0.05 to 3% based on the weight of total monomers charged].

The emulsion or suspension polymerisation process may be carried out using an "all-in-one" batch process (i.e. a process in which all the components to be employed are present in the polymerisation medium at the start of polymerisation) or a semi-batch process in which one or more of the components employed (usually at least one of the monomers) is wholly or partially fed to the polymerisation medium during the polymerisation. Although not preferred, fully continuous processes could also be used in principle.

The polymerisation technique employed must of course be such that an oligomer (low molecular polymer) is formed. This may e.g. be effected by employing a chain transfer agent such as one selected from mercaptans (thiols), certain halohydrocarbons and α-methyl styrene, as is quite conventional. Unsaturated chain transfer agents such as mercaptoolefines may be used, as these will introduce unsaturation into the oligomer.

More preferably, however, the low molecular weight of the oligomer is achieved using the technique of free radical polymerisation using a free-radical forming initiator, in which molecular weight is controlled using a catalytic amount of a selected transition metal complex, and in particular a selected cobalt chelate complex, this technique being known in the art as catalytic chain transfer polymerisation (CCTP).

Such a technique has been described fairly extensively in the literature within the last fifteen years or so. For example, various literature references, such as N.S. Enikolopyan et al, J. Polym. Sci., Polym. Chem. Ed., Vol 19, 879 (1981), disclose the use of cobalt II porphyrin complexes as chain transfer agents in free radical polymerisation, while U.S. Pat. No. 4,526,945 discloses the use of dioxime complexes of cobalt II for such a purpose. Various other publications, e.g. U.S. Pat. No. 4,680,354, EP-A-0196783 and EP-A-0199436, describe the use of certain other types of cobalt II chelates as chain transfer agents for the production of oligomers of olefinically unsaturated monomers by free-radical polymerisation. WO-A-87/03605 on the other hand claims the use of certain cobalt III chelate complexes for such a purpose, as well as the use of certain chelate complexes of other metals such as iridium and rhenium.

The metal chelate complexes disclosed in these references as well as appropriate specific polymerisation techniques disclosed therein for effecting catalytic chain transfer polymerisation are incorporated herein by reference, and any suitable metal chelate complex may be employed in the production of the oligomer used in the present invention.

Perhaps typical of such metal chelate complexes are those described in EP-A-199436 which are cobalt II chelates or vicinal iminohydroxyimino compounds, dihydroxyimino compounds, diazadihydroxy-iminodialkyldecadienes and diazadihydroxyiminodialkylundecadienes, optionally including bridging groups such as $BF_2$ and optionally coordinated with further ligands such as water, alcohols, ketones and nitrogen bases such as pyridine. Particularly preferred in these are optionally hydrated Co II (2,3-dioxyiminobutane-$BF_2)_2$, Co II (1,2-dioxyiminocyclohexane-$BF_2)_2$ and Co II (1,2-diphenyl-1,2-dioxyiminoethane-$BF_2)_2$. The spatial arrangements in such complexes are set out in the specification of EP-A-199436.

Other cobalt II chelates that we have found useful are described in our WO 95/04759, a particularly useful example of which is 2,12-dimethyl-3,7,11,17-tetraazabicyclo[11.3.1]heptadeca-1(17),2,11,13,15-pentaene cobalt (II) bromide monohydrate which may be obtained as described by D. H. Busch and K. M. Long in Inorganic Chemistry, 9(3), 511, (1970).

The metal chelate complex allows the efficient production of oligomers and is generally considered to be acting as a chain transfer agent, although its precise mode of action in molecular weight control is uncertain to us.

The CCT polymerisation process can be carried out in the presence of a polymerisation medium (acting as a carrier medium for the components and as a heat transfer medium) or in the absence of such a medium (i.e. in bulk). When using a polymerisation medium, the polymerisation may be e.g. a solution, suspension or emulsion polymerisation. Typical organic solvents which may be used as the medium for the polymerisation include aromatic hydrocarbons such as benzene, toluene, and the xylenes; ethers such as diethyl ether, tetrahydrofuran, alkoxylated ethylene glycol or polyethyleneglycol; alcohols such as methanol, ethanol. propanol and butanol and their esters with carboxylic acids such as acetic, propionic and butyric acids; ketones such as acetone or methyl ethyl ketone; and liquid tertiary amines such as pyridine. Mixtures of solvents may be used. Water may also be used as a polymerisation medium (sometimes in combination with a solvent(s) such as described above) as in suspension or emulsion polymerisations, and for such processes conventional emulsifying or suspension agents and initiators may be employed (provided they do not unacceptably affect the stability of the metal chelate complex), typical examples of which (and appropriates concentrations thereof) have been described above when discussing such polymerisation techniques for making the oligomer. For the purpose of the present invention, the CCTP is preferably effected by aqueous emulsion or suspension polymerisation (although solution polymerisation could be used) basically as described above but employing a Co metal chelate complex in the process to achieve molecular weight control.

The Co chelates used in the process may be prepared beforehand or may be formed in-situ from the appropriate reactants. The amount of metal chelate required to achieve a given molecular weight is very much lower in comparison to that required with conventional chain transfer agents which are needed at much higher concentration to obtain a comparable molecular weight.

It is generally preferable, in order to maximise the efficiency of the chain transfer polymerisation, that at least one of the monomers is a monomer having a CH=C($CH_3$)— moiety, examples of which include methacrylic acid, methacrylic acid esters and amides, methacrylonitrile, and α-methyl styrene, preferably at least 5 weight % of the monomers used in the polymerisation being such a monomer (s), more preferably at least 25 weight %, and particularly at least 50 weight %. Moreover, where the monomer system employed in CCTP does include such a monomer(s), a proportion of the hydrophilic oligomer molecules normally have terminal unsaturation, inherently produced as a result of the CCT polymerisation process. This proportion may often be >80% of the oligomer molecules (see e.g. EP-A-0261942B).

The monomer system used for the preparation of an olefinic water-soluble oligomer is any suitable olefinically unsaturated monomer(s) which is amenable to (co) polymerisation provided such a monomer system includes a monomer(s), preferably at least an acid-bearing monomer(s) (but possibly also being or including a monomer(s) having a nonionic dispersing groups such as e.g. a polyethyleneglycol acrylate or methacrylate optionally having a capping group such as lower alkyl, e.g. methyl), in sufficient concentration to render the resulting oligomer fully or partially soluble in aqueous media as discussed supra. The oligomer is almost invariably a copolymer of two or more olefinically unsaturated monomers although in principle it could be a homopolymer, The term acid-bearing monomer(s) also includes monomer(s) bearing an acid-forming group which yields or is subsequently convertible to, such an acid group (such as an anhydride, e.g. methacrylic anhydride or maleic anhydride, or an acid chloride). Typical acid-bearing monomers are carboxyl-functional acrylic monomers, olefinically unsaturated dicarboxyl-bearing monomers, and half esters thereof, and anhydrides thereof such as acrylic acid, methacrylic acid, itaconic acid, fumaric acid and maleic anhydride. Sulphonic acid-bearing monomers could also e.g. be used, such as styrene p-sulphonic acid (or correspondingly styrene p-sulphonyl chloride). An acid bearing monomer could be polymerised as the free acid or as a salt, e.g. the $NH_4$ or alkali metal salts of ethylmethacrylate-2-sulphonic acid or 2-acrylamido-2-methylpropane sulphonic acid, or the corresponding free acids. Other, non-acid group functional, non nonionic dispersing group functional monomer(s) which may be copolymerised with the acid and/or nonionic dispersing monomer(s) include alkyl and cycloalkyl acrylate and methacrylate esters and styrenes; also vinyl esters such as vinyl acetate, and vinyl alkanoates, and olefinically unsaturated halides and olefinically unsaturated nitriles. Methacrylates include normal or branched alkyl esters of C1 to C12 alcohols and methacrylic acid, such as methyl methacrylate, ethyl methacrylate, and n-butyl methacrylate, and (usually C5 to C12) cycloalkyl methacrylates acid such as isobornyl methacrylate and cyclohexyl methacrylate. Acrylates include normal and branched alkyl esters of C1 to C12 alcohols and acrylic acid, such as methyl acrylate, ethyl acrylate, n-butyl acrylate, and 2-ethylhexyl acrylate, and (usually C5 to C12) cycloalkyl acrylates such as isobornyl acrylate and cyclohexylacrylate. Styrenes include styrene itself and the various substituted styrenes, such as a-methyl styrene and t-butyl styrene. Nitriles such as acrylonitrile and methacrylonitrile may also be polymerised, as well as olefinically unsaturated halides such as vinyl chloride, vinylidene chloride and vinyl fluoride.

Functional monomers for imparting subsequent crosslinkability (which may also en passent impart other properties such as enhanced substrate adhesion or enhanced water-solubility) may also be included as part of the monomer system for the oligomer; such monomers provide functional groups such as ketonic or aldehydic carbonyl, epoxy, acetoacetyl, hydroxyl, amino, alkoxysiloxane, and olefinically unsaturated bonds. In the case of an olefinic oligomer, examples of such monomers include allyl, epoxy (usually glycidyl) and hydroxyalkyl (usually C1 to C12 e.g. hydroxyethyl) methacrylates and acrylates and acetoacetoxy esters thereof, dienes, as well as keto and aldehyde functional monomers—specific examples being allyl methacrylate, allyl acrylate, acrolein, 1,3-butadiene, isoprene, methacrolein, vinyl methyl ketone, the acetoacetoxy esters of hydroxylalkyl (usually C1 to C12) acrylates and methacrylates such as acetoacetoxyethyl methacrylate and acrylate, and also keto-containing amides such as diacetone acrylamide.

For the sake of convenience such functional monomers of this type, which are not intended include ones with acid groups but might include ones with certain hydrophilic nonionic groups (such as hydroxyalkyl) which, as well as imparting subsequent crosslinkability, could also act as nonionic dispersing groups, are termed herein crosslinking monomers, while those non acidic non nonionic dispersing monomers of the type discussed above which do not have crosslink—providing functional groups are termed herein non acid functional, non nonionic dispersing, non crosslinking monomers.

Typically, an acid functional olefinic oligomer is derived from a monomer system which contains 5 to 50 weight % of acid comonomer(s), preferably 10 to 40 weight % and more preferably 10 to 30 weight %; 0 to 40 weight % of crosslinking monomer(s), preferably 0 to 20 weight %; and particularly 0 to 10 weight %; and 10 to 95 weight % of non acid functional, non nonionic dispersing functional, non-crosslinking comonomer(s), preferably 40 to 90 weight %, and more preferably 60 to 90 weight %. The non acid functional, non nonionic dispersing functional, non-crosslinking comonomer(s) in some cases is usefully selected from one or more of methyl methacrylate, styrene, ethyl acrylate, n-butyl methacrylate, 2-ethyl hexyl acrylate and n-butyl acrylate while the acid monomer is for example methacrylic acid and/or acrylic acid. Useful oligomers of this type are derived from a monomer system which contains 5 to 30 weight % methacrylic acid and/or acrylic acid, 0 to 40 weight % of diacetone acrylamide and/or acetoacetoxy ethyl methacrylate, 10 to 70 weight % methyl methacrylate, 10 to 70 weight % of n-butyl acrylate, 0 to 40 weight % of one or more of ethyl acrylate, 2-ethylhexyl acrylate and n-butyl methacrylate, and 0 to 40 weight % styrene.

As mentioned above, polymer types other than olefinic may be used in the invention process and in particular hydrophilic polyester oligomers may be employed.

A polyester oligomer can be prepared using conventional polymerisation procedures known to be effective for polyester synthesis. Thus, it is well known that polyesters, which contain carbonyloxy (i.e. —C(=O)—O—) linking groups, may be prepared by a condensation polymerisation process in which an acid component (including ester-forming derivatives thereof) is reacted with a hydroxyl component. The acid component may be selected from one or more polybasic carboxylic acids such as di- or tri-carboxylic acids or ester-forming derivatives thereof such as acid halides, anhydrides or esters. The hydroxyl component may be one or more polyhydric alcohols or phenols (polyols) such as diols, triols, etc. (It is to be understood, however, that the polyester may contain, if desired, a proportion of carbonylamino linking groups —C(=O)—NH—, i.e. amide linking groups, by including an appropriate amino functional reactant as part of the "hydroxyl component"; such amide linkages are in fact often useful in that they are more hydrolysis resistant). The reaction to form a polyester may be conducted in one or more stages (as is known). As discussed above, the oligomer in preferably unsaturated, and in-chain unsaturation could be introduced into the polyester by e.g. employing as part of the acid component an olefinically unsaturated dicarboxylic acid or anhydride.

There are many examples of carboxylic acids (or their ester forming derivatives) which can be used in polyester synthesis for the provision of the acid component. One can for example mention $C_4$ to $C_{20}$ aliphatic and alicyclic and aromatic dicarboxylic acids (of C5 to C12 ring carbons) (or higher functionality acids) or their ester-forming derivatives (such as anhydrides, acid chlorides, or lower alkyl esters). Specific examples include adipic acid, fumaric acid, maleic acid, succinic acid, itaconic acid, sebacic acid, nonanedioic acid, decanedioic acid, 1,4-cyclohexanedicarboxylic acid, 1,3-cyclohexanecarboxylic acid, 1,2-cyclohexanedicarboxylic acid, terephthalic acid, isophthalic acid, phthalic acid and tetrahydrophthalic acid. Anhydrides include succinic, trimellitic, maleic, phthalic and hexahydrophthalic anhydrides.

Similarly there are many examples of polyols which may be used in polyester synthesis for the provision of the hydroxyl component. The polyol(s) preferably have from 2 to 6 (2 to 4) hydroxyl groups per molecule. Suitable polyols with two hydroxy groups per molecule include diols such as 1,2-ethanediol, 1,3-propanediol, 1,4-butanediol, 1,6-exanediol, 2,2-dimethyl-1,3-propanediol (neopentyl glycol), the 1,2-, 1,3- and 1,4-cyclohexanediols and the corresponding cyclohexane dimethanols, diethylene glycol, and diols such as alkoxylated bisphenol A products, e.g. ethoxylated or propoxylated bisphenol A. Suitable polyols with three hydroxy groups per molecules include triols such trimethylolpropane (1,1,2-tris (hydroxymethyl) ethane). Suitable polyols with four or more hydroxy groups per molecule include pentaerythritol (2,2-bis(hydroxymethyl)-1,3-propanediol) and sorbitol (1,2,3,4,5,6-hexahydroxyhexane).

The necessary hydrophilicity of the polyester is usually achieved by the presence of acid-functional groups borne by the polyester molecules. These are usually carboxylic acid and/or sulphonic acid groups, particularly at least the latter, and render (or assist in rendering) the polyester water-soluble, either per se or more usually in neutralised form (i.e. so that they exist as acid anion salt groups).

Sulphonic acid groups (or anions thereof may be introduced into the polyester polymer molecules by using at least one monomer having two or more functional groups which will readily undergo an ester condensation reaction (i.e. carboxyl groups, hydroxyl groups or esterifiable derivatives thereof and one or more sulphonic acid groups (for subsequent neutralisation after polyester formation) or sulphonate anion groups (i.e. neutralisation of the sulphonic acid groups already having been effected in the monomer). (In some cases it may not be necessary to neutralise sulphonic acid groups since they may be sufficiently strong acid groups as to be considerably ionised in water and so provide anion groups without the addition of base). Often, the sulphonate anion containing monomer is a dicarboxylic acid monomer having at least one sulphonic acid salt group substituent (thereby avoiding any need to effect neutralisation subsequent to polyester formation). (Alternatively, alkyl carboxylic acid ester groups may be used in place of the carboxylic acid groups as ester-forming groups). Such a monomer will therefore be part of the acid component used in the polyester synthesis.

The sulphonate anion groups will, of course, have the formula —$SO_2O^-$, with the counter ion usually being $H^+$, alkali metal or alkaline earth metal cation (the latter being divalent and so being associated with two sulphonate anion groups instead of one), ammonium, organic amine cations such as those derived from trialkylamines (e.g. triethylamine, tributylamine), morpholine and alkanolddi-amines and quaternary ammonium cations. It is particularly preferred that the cation is selected from $Na^+$, $Li^+$ and $K^+$.

Examples of compounds for providing sulphonate anion groups are the alkali metal salts of sulphonic acid substituted aromatic dicarboxylic acid such as those of formula:

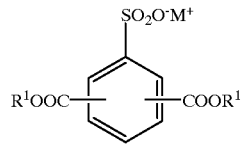

where M is sodium, lithium or potassium and $R^1$ is H or lower alkyl of 1 to 5 carbon atoms (such as methyl or ethyl). Preferred examples of sulphonic acid salt substituted aromatic dicarboxylic acids are the alkali metal salts of 5-sulpho-1,3-benzene dicarboxylic acid, which have the formula:

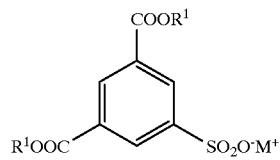

where M and $R^1$ are as defined above. Particularly preferred is the sodium salt (M=Na) where $R^1$=H, this material being commonly known as sodio-5-sulphoisophthalic acid (SSIPA).

Carboxylic acid groups may be incorporated into the polyester by various means. For example, if the hydroxyl component of the reactants is stoichiometrically in excess of the acid component, a hydroxyl-terminated polyester can be formed, which may be subsequently converted to a carboxyl terminated polyester by reacting the hydroxyl groups with an appropriate reagent (such as an acid anhydride or a dicarboxylic acid). Alternatively terminal carboxyl functionality may be directly introduced by employing an appropriate stoichiometric excess of the acid component reactants. Yet further, chain-pendant carboxyl groups may be introduced by using reagents such dimethylol propionic acid (DMPA) since if appropriate reaction conditions are employed (e.g polymerisation temperature below 150° C.) the hindered carboxyl group thereof does not take part to any significant extent in the ester-forming reaction during the polyester synthesis and the DMPA effectively behaves as a simple diol. Chain-pendent and/or terminal carboxyl groups could also be introduce by employing a tri- or higher functionality carboxylic acid or anhydride in the polyester synthesis such as trimellitic acid or anhydride. Combinations of each procedures could be used of course. It is thus seen that terminal or side-chain carboxyl groups or both can be introduced as desired. These can be fully or partially neutralised with an appropriate base to yield carboxylate anion groups. The counter ions used may be as for the sulphonate anions described above (apart from $H^+$ since the carboxylic acid groups themselves are normally insufficiently ionised to provide a significant amount of carboxylate anion groups—although F substituents would increase acid strength), with alkali metal ions such as $Na^+$, $Li^+$ and $K^+$ again being particularly preferred.

The polyester may optionally incorporate hydrophilic non-ionic segments within the polyester backbone (i.e. in-chain incorporation), or as chain-pendant or terminal groups. Such groups may act to contribute to the water solubility of the polyester. For example, such polyethylene oxide chains may be introduced into the polyester during its synthesis by using as part of the hydroxyl component, ethylene oxide-containing mono, di- or higher functional hydroxy compounds such as polyethylene glycols, and alkyl ethers of polyethylene glycols.

The amount of sulphonate anion and/or carboxylate anion groups present in the polyester should be sufficient to provide or contribute to the water solubility of the polyester. This amount will depend, inter alia, on factors such as the hydrophilicity/hydrophobicity of units provided by other monomers in the polyester synthesis or any surfactants (if used), and also the relative proportions of sulphonate and carboxylate anion groups. With regard to the last mentioned point, sulphonate anions are more effective at providing or contributing to water-solubility than carboxylate anion groups, and so can in general be used at lower levels in comparison to those of carboxylate anion groups.

If the polyester is wholly or predominantly sulphonate stabilised (by which is meant the water solubility-providing groups are provided wholly or predominantly by sulphonate anion groups) the sulphonic acid group content is preferably within the range of from 7.5 to 100 milliequivalents (more preferably 10 to 75 milliequivalents) per 100 g of polyester. When using SSIPA as the monomer for providing the sulphonate anion groups, the amount of this monomer used in the polyester synthesis, based on the weight of all the monomers used in the polyester synthesis will usually be within the range of from 2 to 20% by weight (more usually 3 to 15% by weight). The carboxylic acid value AV of polyester which is predominantly sulphonate stabilised, i.e. an AV based on the carboxylic acid groups only (i.e. excluding sulphonate groups) will generally be within the range of from 0 to 100 mgKOH/g, more preferably 0 to 50 mgKOH/g, and particularly 0 to 25 mgKOH/g.

If the polyester is predominantly carboxyiate anion stabilised, the carboxylic acid value AV of the polyester is preferably within the range of from 20 to 140 mgKOH/g (more preferably 30 to 100 mgKOH/g.

Often, the polyester will be predominantly sulphonate-stabilised.

The polyester may also have functional groups for imparting subsequent crosslinkability; in particular these may be hydroxyl groups. In order to achieve hydroxyl-functional in the resulting polyester a stoichiometric excess of the hydroxyl component in relation to the acid component should be used, i.e. the ratio of OH groups/$CO_2$H groups should be >1. Preferably, if hydroxyl functionality is present, the average hydroxyl functionality is >2, preferably $\geq 2.3$ (average hydroxyl functionality is determined by dividing the number average weight molecule weight Mn by the hydroxy equivalent weight) and to achieve this it will be necessary for the polyester to have a branched structure, which may be achieved (as is conventional) by employing monomers having tri- or higher functionality (e.g. triols, tetrols, etc, tricarboxylic acids, tetracarboxylic acids etc) in addition to monomers having difunctionality (such as diols and dicarboxylic acids). The hydroxyl groups may be located both terminally and laterally (chain pendant) on the polyester chains. A hydroxyl terminated polyester could also of course (as mentioned above) be used as a bulky building block for the production of a polyesterurethane, so that the resulting oligomer will have both urethanic and polyester character derived from the urethane and ester segments.

As mentioned above, unsaturation may be incorporated into the polyester by using unsaturated monomers such as maleic or fumaric acid in the polyester synthesis, so that the resulting unsaturation is in-chain. It would also be possible to introduce unsaturation into the polyester by functionalising a proportion of any hydroxyl groups present (see supra) using unsaturated fatty acids or unsaturated fatty acid-containing oligomers (by (trans)esterification), or by transesterification using (semi)-drying oils or maleinised oils.

A polyester oligomer preferably has a hydroxyl number within the range of from 25 to 250 mg KOH/g, more preferably 45 to 200 (corresponding to a hydroxyl group percentage of 1.1 to 7.6% w/w, more preferably 1.4 to 6.1% w/w).

The esterification polymerisation processes for making polyesters are well known and need not be described here in detail. Suffice to say that they are normally carried out in the melt using catalysts such as tin-base catalysts and with the provision for removing any water (or alcohol) formed from the condensation reaction.

No particular compounds or additives are needed in polyester synthesis to achieve oligomers of low molecular weight (i.e. of molecular weight comparable e.g. to olefinic oligomers discussed above) since polyesters do not in fact easily form very high molecular weight materials (unlike free radical addition polymers) e.g. not usually exceeding Mn of 10,000, so an oligomeric material is likely to form naturally from the polyester synthesis without the presence of any special components therefor.

Control of the polyester molecular weight can readily be achieved by adjustment of the stoichiometry of reactants and the conditions of the polymerisation (e.g. time, temperature and pressure of the polymerisation and the catalyst type and amount).

An aqueous solution of an acid-functional polyester oligomer may be readily prepared by dispersion of the solidified melt from the condensation polymerisation directly into water, the acid groups thereof being in neutralised (salt) form prior to dispersion (e.g. by using monomers which are in salt form for the polymerisation) or after dispersion by the addition of a base for neutralisation (if necessary). The solidified melt is preferably in a form such as flake (which can often be obtained directly from the melt) or comminuted solid (obtained for example by grinding). Alternatively, water can be added directly to the hot polyester melt. Still further, the polyester may be dispersed in water by adding an aqueous pre-dispersion (or organic solvent solution) of the polyester to the water phase.

The oligomer used in the invention process irrespective of how made (e.g. whether a polyester or an olefinic polymer) preferably has a number average molecular weight Mn within the range of from 500–50,000 g/mol, more preferably 750–25,000 and particularly 1,000–5,000. Polyester oligomers of Mn>10,000 in combination with the necessary water-solubility characteristics are in any case not easily obtainable. (Polymer molecular weights may be determined by gel permeation chromatography calibrated using an appropriate known polymer as standard). The glass transition temperature Tg of the oligomer may vary widely according to the intended application of the resulting polymer latex but a typical range is −30 to 150° C.

Returning now to the (preferably hydrophobic) latex polymer. The aqueous emulsion polymerisation process employed to form this may be that of a conventional aqueous emulsion polymerisation process and basically as described above when discussing the use of such a process for the preparation of an olefinic oligomer except that chain transfer agents are not normally employed (or if they are used, are present in a much smaller amount).

The monomer system employed for the formation of the latex polymer is preferably such that the resulting polymer is preferably hydrophobic as described. Similar non acid functional, non nonionic dispersing, non crosslinking monomers to those used for making a olefinic oligomer may be employed, and in particular styrenes, such as styrene itself, α-methylstyrene, o-, m- and p-methylstyrene, o-, m-, and p-ethylstyrene, p-chlorostyrene and p-bromostyrene; normal and branched acrylic and methacrylic esters of alkanols (usually 1–12C) and cycloalkanols (usually C5–C12 ring carbons) such as methyl methacrylate, ethyl methacrylate, n-butyl methacrylate, t-butyl methacrylate, 2-ethylhexyl methacrylate, isobornyl methacrylate and cyclohexyl methacrylate and the corresponding acrylates; vinyl esters such as vinyl acetate and vinyl alkanoates; olefinically unsaturated halides such as vinyl chloride, vinylidene chloride and vinyl fluoride, and olefinically unsaturated nitriles such as acrylonitrile and methacrylonitrile. The emulsion polymer itself could be a single stage polymer (i.e. produced in essentially a single polymerisation stage, including seeded polymerisation), so that particles of homogeneously uniform composition are formed, or it could be formed by a sequential process so as to produce particles with regions of significantly differing polymer composition (e.g. as in core/shell particles).

Functional, non acid-bearing crossliking monomers such as those described for an olefinic oligomer may also be included if desired to provide subsequent crosslinkability and (other possibly en passent properties such as improved adhesion to a substrate); again such monomers provide functional groups such as ketonic or aldehydic carbonyl, epoxy, acetoacetyl, hydroxyl, amino, alkoxysilane and carbon to carbon double bonds.

Examples of such monomers include allyl, hydroxyl, and epoxy functional (meth)acrylates such as allyl methacrylate, hydroxyalkyl (usually C1–C12) methacrylate e.g 2-hydroxyethyl methacrylate, glycidyl methacrylate, and the corresponding acrylates, dienes such as 1,3-butadiene and isoprene, as well as keto- and aldehyde-functional monomers such as acrolein, methacrolein and methyl vinyl ketone, acetoacetoxy esters of hydroxyalkyl (usually C1–C12) acrylates and methacrylates such as acetoacetoxy-ethyl acrylate and methacrylate, and also keto or aldehyde-containing amides such as diacetone acrylamide.

Amino functionality could be incorporated into the emulsion polymer by employing suitable amino-functional monomers in the polymerisation process, examples of which include t-butylamino ethyl methacrylate and dimethylamino ethylmethacrylate. Amino functionality could also be incorporated into the emulsion polymer by first preparing a precursor copolymer comprising polymerised units of at least one olefinically unsaturated monomer having an amine precursor group(s) (i.e. a group which may be subsequently reacted to provide a pendant amine group) in addition to the other olefinically unsaturated monomer(s) employed (these not providing amine precursor groups), and subsequently reacting at least a proportion of the amine precursor groups to provide amine functional groups. For example, the amine precursor groups may be carboxyl groups, which may be converted to provide amine groups by an imination reaction using an alkylene imine such as ethylene imine or propylene imine.

Acid functional monomers could also be included as comonomers (e.g. acrylic or methacrylic acid), although at such a level (depending on their nature) as to not affect the preferred hydrophobic character of the resulting polymer (except of course when they are being incorporated to provide precursor groups for conversion to non acid groups such as amino groups via imination as discussed above, in which case they will be largely or entirely subsequently converted to such non acid groups in any case). Generally speaking, the monomer system used to make the latex polymer will usually contain less than 10 weight % of any acid-functional monomer(s) (no matter of what type) (unless of course they are to be reacted further e.g. by imination), preferably less than 7.5 weight %, and more preferably less than 5 weight %, and in some preferred embodiments none at all.

The preferred hydrophobic latex polymer is in some cases usefully made form a monomer system which comprises at least one of styrene, $C_{1-10}$-alkyl methacrylate (such as methyl methacrylate, 2-ethylhexyl methacrylate, and n-butyl methacrylate), and $C_{3-10}$-alkyl acrylate (such as n-butyl acrylate), optionally methacrylic and/or acrylic acid and optionally diacetone acrylamide and/or acetoacetoxy ethyl methacrylate.

The polymerisation to make the latex polymer could be carried out using a chain transfer agent, but (unlike in the preparation of an olefinic oligomer) is usually effected without the use of (or with a much smaller amount) of such a material (as mentioned above).

The number average molecular weight Mn of the latex polymer, should always be higher than that of the oligomer, and is usually $\geq 10,000$, more usually $\geq 20,000$ g/mol. The upper limit does not usually exceed 5,000,000 (more usually 1,000,000 g/mol). Normally the Mn of the latex polymer (before any grafting) will be $\geq 3,000$ g/mol, usually $\geq 5,000$, preferably $\geq 30,000$, and particularly $\geq 60,000$, higher than the Mn of the oligomer. Most preferably, the Mn difference is $\geq 100,000$ g/mol.

The Tg of the latex polymer may vary between wide limits depending upon the intended application, although a common range will be −50 to 150° C., more preferably −10 to 70° C.

The z average particle size of the polymer latex may vary between wide limits (as mentioned above), a common range being from 0.03 to 0.6 μm, more usually 0.04 to 0.31 μm.

In many cases commercially available polymer latices, or at any rate polymers readily to hand and not especially prepared for the invention process, may be used for the latex polymer component of the invention process, and there is no need to employ an especially prepared latex polymer (although one can do so if desired).

The polymer latex used in the invention method will usually be the basically "as is" latex from emulsion polymerisation (possibly modified by the addition or removal of water to adjust solids content). It may in some cases, however, be useful to use an emulsion polymer which, by virtue of the monomers employed (or possibly by post grafting of suitable monomer) bears hydrophilic centres (e.g. nonionic polyethylene oxide chains, or ionic groups) wherein the emulsion polymer can be dried (e.g. by spray drying), stored, and then redispersed into water at the appropriate time to form a polymer latex. This could have advantages when it is necessary to transport the emulsion polymer long distances from its place of preparation before use.

Examples of free radical polymerisable monomer(s) which may be polymerised in the presence of the oligomer and latex polymer include in principle any of those set out above for the production of an olefinic oligomer or an emulsion polymer. However, more specific examples include one or more of C1–C10 alkyl (meth)acrylates, particular examples of these being methyl methacrylate, n-butyl, acrylate, n-butyl methacrylate, methyl acrylate, ethyl acrylate and 2-ethylhexyl acrylate. Other examples include the various styrenes, including styrene itself and a-methyl styrene, methacrylonitrile, acrylonitrile, vinyl chloride and vinylidene chloride.

The polymerisable monomer(s) may simply be added to the system of oligomer and emulsion polymer. For example, the monomer(s) may be incorporated by adding to the bligomer before admixture of both with the latex polymer, this being a preferred option (neutralisation if necessary being carried out before or after such addition), or adding to the latex polymer before admixture of both with the oligomer, or adding to a blend of the oligomer and latex polymer. Combinations of such methods may be used. The monomer(s) may also be wholly or partially fed to the reaction medium during the polymerisation (continuously or in aliquots).

Polymerisation may be effected by the use of an appropriate free-radical yielding initiator (usually water-soluble); this may in principle be initiator remaining from the polymerisation to make the emulsion polymer (if a high level was used), but is normally a freshly added material. Usually appropriate heating (e.g 30 to 120° C.) and agitation (stirring) is employed. Examples of suitable initiators include hydrogen peroxide, t-butyl-hydroperoxide, cumene hydroxperoxide, persulphates such as $NH_4$ persulphate, K persulphate and Na persulphate; redox systems may be used; combinations such as t-butyl hydroperoxide, isoascorbic acid and Fe EDTA may be useful; the amount of initiator, or initiator system, is generally 0.05 to 5 (0.1 to 2) weight % based on the weight of total monomer(s) added. The choice of initiator and its concentration can be important and can e.g. be used to control the extent of grafting.

The latex polymer (and for that matter the oligomer), which is used in the invention process preferably contains $\leq 10$ weight % of residual monomer(s) from the polymerisation to make it, more preferably $\leq 5$ weight %, still more preferably ≦2 weight %, based on the total weight of monomer(s) charged for the polymerisation.

As mentioned above, one or both of the oligomer and latex polymer may optionally bear functional groups for imparting latent crosslinkability to the composition (i.e. so that crosslinking takes place e.g. after the formation of a coating therefrom). For example, both the oligomer and latex polymer can carry coreactive groups, e.g. amino groups on one of the polymers and epoxy groups on the other, or keto or aldehyde carbonyl groups on one of the polymers and amino groups on the other, so that a self-crosslinking (1-pack) system could be envisaged. Alternatively, one or both polymer could carry functional groups such as hydroxyl groups and the composition subsequently formulated with a crosslinking agent reactive with the functional groups on coating, such as polyisocyanate, melamine, or glycoluril; or the functional groups on one or both polymers could include keto or aldehyde carbonyl groups and the subsequently formulated crosslinker could be a polyamine or polyhydrazide such as adipic acid dihydrazide, oxalic acid dihydrazide, phthalic acid dihydrazide, terephthalic acid dihydrazide, isophorone diamine and 4,7-dioxadecane-1,10-diamine. Combinations of such expedients could also be used.

A particular preferred composition is one which contains an invention polymer latex composition in which the oligomer and optionally the emulsion polymer bear isocyanate-reactive groups such as hydroxyl groups (and/or amine groups) and the crosslinking agent is an aqueous-dispersed organic polyisocyanate.

Accordingly, there is further provided according to the invention an aqueous-based crosslinkable composition comprising an invention polymer latex composition as defined above in which the oligomer and optionally the latex polymer bear isocyanate-reactive groups (particularly hydroxyl), and an aqueous-dispersed polyisocyanate.

The organic polyisocyanate component may itself be self water-dispersible (by virtue e.g. of incorporated hydrophilic groups, such as polyethylene oxide chains) but this is not essential, since the water-soluble oligomer also serves as an emulsifier or dispersing agent for the added polyisocyanate. External surfactant(s) may also be used to assist in the dispersion, but, again, such use is not essential and depends on the nature/structure of the type of polyisocyanate used. The polyisocyanate may be incorporated into the invention polymer latex by any suitable technique—simple stirring at ambient temperature usually being sufficient. It may sometimes be useful to employ an organic liquid (e.g. ethylacetate) to facilitate mixing and decrease viscosity.

The polyisocyanate component may be any organic polyisocyanate containing (cyclo)aliphatically, araliphatically and/or aromatically bound NCO groups which are normally liquid at ambient temperature. More preferably, it is a polyisocyanate (or polyisocyanate mixture) having only aliphatically and/or cycloaliphatically bound isocyanate groups.

Suitable polyisocyanates include those based on 1,6-hexane-diisocyanate, 1-isocyanato-3,3,5-trimethyl-5-isocyanatomethyl cyclohexane (isophorone diisocyanate) and/or bis-(isocyanatocyclohexyl)-methane, namely the biuret, urethane, uretdione, and/or isocyanurate derivatives of such diisocyanates. Preferred aliphatic polyisocyanates include biuret polyisocyanates based on 1,6-hexane-diisocyanates and which are based on mixtures of N,N',N"-tris-(6-isocyanatohexyl)-polyisocyanates with small quantities of its higher homologues. Also preferred are the cyclic trimers of 1,6-hexane-diisocyanate which are based on N,N'- N"-tris-(6-isocyanatohexyl)-isocyanurate in admixture with small quantities of its higher homologues. Also preferred are such trimers when modified with polyethylene oxide chains to render them water-dispersible.

Aromatic polyisocyanates which may be used include those based on 2,4-diisocyanato-toluene or commercial mixtures thereof with 2,6-diisocyanato-toluene, or based on 4,4'-diisocyanatodiphenylmethane or mixtures thereof with its isomers and/or higher homologues.

Where a crosslinking agent is employed in an invention polymer latex in which the oligomer and optionally the latex composition polymer has crosslinker functional groups, it is preferred than the amount of crosslinking agent that is employed is such that the ratio of the number of crosslinker groups present in the oligomer plus (if employed) in the latex polymer to the number of reactive groups (for crosslinking purposes) in the crosslinking agent is within the range of from 1/10 to 10/1, more preferably 1/5 to 5/1.

The solids content of a invention polymer latex composition is usually within the range of from about 10 to 70 wt % on a total weight basis, more usually 30 to 60 wt %. Solids content can, if desired, be adjusted by adding water or removing water (e.g. by distillation or ultrafiltration).

The relative amounts of the oligomer and the polymer in the invention aqueous polymer latex composition are preferably such that the weight % of the oligomer, based on the weight of the oligomer plus the polymer in the polymer latex, is preferably within the range from 1 to 70 weight %, more preferably 5 to 70 weight %, and particularly 3 to 50 weight %.

The amount of free-radically polymerisable monomer(s) which may be polymerised in the presence of the oligomer and latex polymer is preferably in the range of from 0.1 to 20% by weight, based on the weight of oligomer and polymer, more preferably 0.1 to 10% by weight and particularly 0.5 to 5% by weight.

The polymer latex compositions of the invention may be used "as is" or may be combined or formulated with one or more additives or components to provide formulated aqueous compositions therewith (e.g. with a polyisocyanate as mentioned above).

Examples of such additives or component include defoamers, rheology control agents, thickeners, dispersing and stabilising agents (usually surfactants), wetting agents, fillers, extenders, other polymers or resins, fungicides, bacterocides, coalescing and wetting solvents, plasticisers, anti-freeze agents, waxes, pigments, and of course crosslinking agents (as discussed above).

The aqueous compositions may e.g. be used, appropriately formulated if necessary, for the provision of films, polishes, varnishes, lacquers, paints, inks and adhesives. However, they are particularly useful and suitable for providing the basis of protective coatings for wooden substrates (e.g. wooden floors), and plastics, paper, cementitious and metal substrates, and also for inks applications.

The composition once applied may be allowed to dry naturally at ambient temperature, or the drying process may be accelerated by heat. Crosslinking can be developed (if the composition is crosslinkable) by allowing to stand for a prolonged period at ambient temperature (several days) or by heating at an elevated temperature for a much shorter period of time.

The minimum film forming temperature (MFFT) of an invention composition is preferably within the range of from 0 to 60° C. [MFFT is the temperature where the composition forms a smooth and crackfree coating or film using DIN 53787 and applied using a Sheen MFFT bar SS3000].

The present invention is now further illustrated, but in no way limited, by reference to the following example. Unless otherwise specified all parts, percentages, and ratios are on a weight basis. The prefix C before an example denotes that it is comparative.

In the example, the following abbreviations are used

| | |
|---|---|
| MMA | methyl methacrylate |
| MAA | methacrylic acid |
| BMA | n-butyl methacrylate |
| BA | n-butyl acrytate |
| AA | acrylic acid |
| APS | ammonium persulphate |
| Mn | number average molecular weight |
| Mw | weight average molecular weight |
| CoBF | Co II (2,3-dioxyiminobutane-$BF_2)_2$ |
| EHA | 2-ethyl hexyl acrylate |
| HPMA | hydroxy propyl methacrylate (mixture of isomers as supplied by the manufacturer Aldrich) |
| APS | ammonium persulphate |
| NPG | neopentyl glycol |
| THPA | tetrahydrophthalic acid |
| IPA | isophthalic acid |
| SSIPA | 5-(sodiosulpho)isophthalic acid |
| Surfagene FAZ109V | complex phosphate ester of nonylphenol polyethylene oxide |
| $NH_3$ | ammonium hydroxide solution (25%) |
| Desmodur KA-8630 | hydrophilically modified polyisocynate based on the biuret trimer of hexamethylene diisocyanate, available from Bayer |
| Methoxy-PEG | poly(ethylene glycol) methylether, average molecular weight 750 |
| SLS | sodium lauryl sulphate |
| CVA | 4,4$^1$-azobis(4-cyanovaleric acid) |

EXAMPLE 1

An oligomer of MMA/MAA=80/20 was prepared using cobalt catalytic chain transfer polymerisation in an aqueous emulsion polymerisation process as follows.

Preparation of 80/20 MMA/MAA oligomer

All liquids were deoxygenated by passage of nitrogen through them for >1 hour prior to use. A 5 liter round bottomed reaction vessel fitted with glass baffles, a mechanical paddle stirrer and water condenser was evacuated and filled with nitrogen 3 times. The reaction vessel was charge with deoxygenated, deionised water (900 cm$^3$), SLS (8.4 g) and CVA (5.08 g). The contents were heated to 75° C. by an extemal water bath. CoBF (0.1803 g) was added to a separate vessel which was evacuated and filled with nitrogen 3 times. MMA (342 cm$^3$) and MAA (79 cm$^3$) were added by syringe to the CoBF. The solution of CoBF in monomers was fed at a linear rate to the reaction vessel using syringes attached to syringe pumps over a period of 1 hour. The vessel was agitated and maintained at 75±2° C. throughout the feed and for a further 10 hours before the contents were allowed to cool to ambient temperature. Mn was ca 1160 and Mw/Mn was ca. 2.1. An aqueous solution was prepared by adjusting pH to 8.0 with ammonium hydroxide.

Post-grafting of oligomer and polymer latex 52.1 g of the aqueous oligomer solution (28.1 wt % solids) were mixed with 2.19 g of MMA (3 wt % on total polymer solids) for 15 minutes. This was then added to 130 g of an aqueous latex of a polymer of BMA/BA/MMA/AA=50/20/25/5 (45.0 weight % solids, z average particle size, as determined by a Malvern Autosizer 2c, ca. 95 nm) in a 500 ml round bottomed flask and stirred for 30 minutes at room temperature. The mixture was heated to 85° C., and a solution of 0.219 g of APS (0.3 wt % on solids) in 1.0 g water was added. After heating for 2 hours at 85° C., the mixture was cooled to room temperature. The ratio of oligomer/latex polymer was 20:80 (on a solids/solids basis).

Some properties of the resulting aqueous polymer composition, which was according to the invention, were evaluated as follows, using a non grafted blend of the same overall oligomer/polymer composition as a comparison.

Effect of invention grafting on polymer latex response to associative thickener

To 15 g of the invention aqueous polymer composition (or comparative oligomer/latex mixture) (at constant solids) was added 0.27 g of Tafigel PUR 40 (urethane-based associative thickener supplied by Munzing Chemie) and mixed well. Low shear viscosity was measure using a Bohlin Rheometer.

| Sample | Viscosity (Pas) |
|---|---|
| latex polymer/oligomer (comparative blend) | 1.2 |
| latex polymerloligomer (acc to inv) | 89 |

It was thus found that the invention polymer composition was dramatically greater in viscosity in comparison to the simple comparative blend.

Effect on open-time of polymer latex

Open time of a latex is measured by applying latex to a test card with a brush. At specified time intervals later (typically 3 mins) the brush is rewetted slightly with latex then re-brushed through the coating at a direction of 90° to the original brushing direction. The time taken for permanent brushmarks to be seen in the over-coating corresponds to open time.

| Sample | Open time/min |
|---|---|
| latex polymer/oligomer (comparative blend) | 9 |
| latex polymer/oligomer (acc. to inv.) | 18 |

The open-time of the invention polymer latex was found to be considerably longer than that of the simple comparative blend.

EXAMPLE 2

In this example grafting was effected using a polyester oligomer (instead of an olefinic oligomer as in the previous example), the polyester being unsaturated.

55 g of an 29.1 wt % aqueous solution of a polyester formed from reacting NPG (25%), methoxy-PEG (10%), diethylene glycol (10%), THPA (10%), TPA (35%) and SSIPA (10%) was mixed with MMA (2.4 g) (3 wt % on polymer solids) for 15 minutes. This was then added to 142.3 g of an aqueous latex (as described in Example 1) then heated to 85° C. and a solution of APS (0.25 g in 1 g water) (0.3% on solids) was added. After heating for 2 hours at 85° C., the mixture was cooled to room temperature. The ratio of oligomer/latex was 20:80 (on a solids/solids basis).

Some properties of the resulting invention aqueous polymer composition, were evaluated as follows, using a non grafted blend of the same overall oligomer/polymer composition as a comparison.

Effect on open-time of polymer latex

| Sample | Open time/min |
|---|---|
| latex polymer/polyester oligomer (compartative blend) | 12 |

-continued

Effect on open-time of polymer latex

| Sample | Open time/min |
| --- | --- |
| latex polymer/polyester oligomer (acc. to inv.) | 21 |

The open-time of the invention polymer latex was considerably longer than that of the comparative blend.

Effect on film compatibility

Coatings were applied on glass plates and dried at room temperature to form film coatings. The plates were then held at 60° C. for 1 hour, then allowed to cool before film appearance was assessed.

| Sample | Appearance |
| --- | --- |
| latex polymer/polyester oligomer (compartative blend) | hazy due to incompatibility |
| latex polymer/polyester oligomer (acc. to inv.) | clear, glossy |

It was thus found that the compatibility in a film derived from the invention polymer latex was significantly better than that from a comparative blend.

EXAMPLE C3

In this example, a sequentially formed polymer latex composition (not according to the invention) was formed by forming a polymer emulsion in the presence of an oligomer (in-situ preparation).

A 1 litre round bottomed reaction vessel fitted with glass baffles, a mechanical stirrer, thermocouple, monomer feed funnel fitted with a mechanical stirrer, and reflux condenser, was charged with distilled water (129.8 g), Surfagene FAZ109V (13.6 g) and $NH_3$ (0.5 g). Distilled water (20.9 g), APS (0.98 g), Surfagene FAZ109V (20.4 g) and a 30.2% aqueous solution of acrylic oligomer (composition MMA/MAA=80/20, Mn ca.1730, Mw/Mn ca. 1.88) prepared using the same procedure as used in Example 1 were charged to a monomer feed funnel. A mixture of BA (42.5 g), BMA (106.4 g), MMA (53.2g), AA (10.6 g) and $NH_3$ (10.1g) was added with stirring until an emulsified mixture was obtained. The contents of the flask were heated to 85° C. with constant stirring, then 10% of the emulsified monomer mixture was added. After 5–10 minutes the remaining monomer feed was added to the stirred reaction mixture over a period of 90 minutes at a temperature of 88° C.±2° C. At the end of the monomer addition, the resulting latex product was stirred for a further 30 minutes at 85° C., then cooled to ambient temperature and filtered through a 53 μm cloth.

Filtration of the product was very slow, and removed a large quantity of very fine sediment which blocked the filter cloth. In a portion of latex which was not filtered approximately one third of the latex volume sedimented out over a 2 day period, indicating the poor stability of the product.

The approximate level of free monomer in the product was measured: 100.0 ml of filtered latex, 150 ml of distilled water, 2 ml Bevaloid anti-foam agent and 0.3 ml of 1% hydroquinone solution were charged to a 500 ml round bottomed flask fitted with a calibrated Dean and Stark receiver and condenser. The Dean and Stark receiver was filled with distilled water, then the contents of the flask were heated under reflux for 30 minutes. After cooling, the volume of immiscible liquid on top of the water in the Dean and Stark receiver was measured using volumertric markings on the glass. The volume (ml) of immiscible condensate obtained was quoted directly as the % (v/v) free monomer in the latex.

| Sample | % free monomer (±0.05%) |
| --- | --- |
| aq latex composition prepared in Example C3 | 0.5 |
| aq polymer latex composition (acc. to inv.) prepared in Example 1 | <0.05 |

The level of both sediment and free monomer found in a latex prepared according to the invention was thus much lower than corresponding values for a latex prepared using a sequential (in-situ) polymerisation procedure.

EXAMPLE 4

In this example, a crosslinkable aqueous polymer composition was made according to the invention process.

An oligomer of composition MMA/MAA/HPMA=70/10/20 was prepared using a process as described in Example 1; Mn was ca. 1975 and Mw/Mn was ca. 1.92. An aqueous solution of the oligomer was prepared by adjusting pH to 8.0 with ammonium hydroxide (29.2% solids). 50.1 g of the oligomer solution was then reacted according to the invention, as described in Example 1 (using the same polymer latex).

The resulting aqueous polymer latex composition was admixed with a polyisocyanate crosslinker in an NCO:OH equivalent ratio of 2:1 to form a crosslinkable composition.

Thus, grafted polymer latex (40% solids, 50.0 g) and Desmodur KA-8630 (2.69 g) were stirred together for 30 minutes. The resulting formulation was applied to a glass panel (wet-film thickness 150 μm). After allowing the applied coating to dry at room temperature the panel was held at 60° C. overnight before testing.

A comparative blend of latex and oligomer (based on the same compositions and relative amounts as described in this example but without a grafting stage) was mixed with Desmodur KA-8630 (at an NCO;OH equivalent ratio of 2:1) for 30 minutes before forming a film from the latex product on a glass panel and curing under the same conditions as described above.

The resistance of the coatings was evaluated using a methyl ethyl ketone (MEK) double rubs test.

| Sample | MEK double rubs |
| --- | --- |
| latex polymer/oligomer (comparative blend) | 50 (film dissolved) |
| latex polymer/oligomer (acc. to inv.) | 130 (adhesive failure) |

The film coating derived from the invention polymer latex was thus found to have a higher solvent resistance than that from the comparative blend.

[In the double rubs test, a piece of cotton wool soaked in solvent (e.g. MEK) is rubbed over the surface of a coating backwards and forwards. One forward and back motion is defined as a double rub. Rubbing is continued until failure is reached (failure being the point where the film coating is no longer intact) or until a maximum of 200 double rubs is achieved without failure, whereon the film is assessed qualitatively.]

We claim:

1. Method of grafting a water-soluble organic oligomer(s) to an organic polymer(s) in aqueous latex form, which method comprises forming a water-based mixture of a water-soluble oligomer(s), an aqueous latex of an emulsion polymer(s) and at least one free radical polymerisable monomer which is present in an amount of 0.1 to 20% by weight based on the weight of said oligomer(s) and said polymer(s), both of said oligomer(s) and polymer(s) being preformed, and carrying out free radical polymerisation of said at least one monomer to effect grafting between said oligomer(s) and said polymer(s).

2. Method according to claim 1 wherein said oligomer(s) is completely or substantially completely dissolved in the aqueous medium prior to grafting.

3. Method according to claim 1 wherein the necessary hydrophilicity of the oligomer(s) (for imparting water-solubility) is provided or contributed to by virtue of is the presence of acid functional groups borne by the oligomer molecules which render, or assist in rendering, the oligomer water-soluble per se or by neutralisation.

4. Method according to claim 1 wherein the necessary hydrophilicity of the oligomer(s) (for imparting water-solubility) is provided or contributed to by virtue of the presence of nonionic dispersing groups borne by the oligomer.

5. Method according to claim 1 wherein the preformed oligomeric and polymeric materials and monomer(s) to be polymerised are admixed prior to grafting by adding the preformed oligomer(s) and the monomer(s) to be polymerised, themselves optionally being in admixture, to the latex polymer(s) and then polymerising.

6. Method according to claim 5 wherein if neutralisation of the oligomer(s) is required to achieve water-solubility thereof this is effected prior to or during adding it to the latex polymer or subsequent to such addition.

7. Method according to claim 1 wherein a free-radical yielding initiator(s) is incorporated into the oligomer/latex polymer/monomer combination.

8. Method according to claim 1 wherein the oligomer is a polyester, polyurethane or polyamide, or an olefinic polymer (made by the polymerisation of at least one olefinically unsaturated monomer).

9. Method according to claim 1 wherein the oligomer is employed in the form of an aqueous solution which is admixed with the polymer latex, optionally in combination with the monomer(s) to be polymerised, where said aqueous oligomer solution has been prepared by adding solid oligomer to water, with subsequent neutralisation if necessary by the addition of a base to the water prior to, during, and/or subsequent to the addition of the oligomer to the polymer latex.

10. Method according to claim 1 wherein the oligomer is employed in the form of an aqueous solution which is admixed with the polymer latex, optionally in combination with the monomer(s) to be polymerised, where said aqueous oligomer solution has been formed by aqueous emulsion or suspension polymerisation of olefinically unsaturated monomer(s), at least one of which being acid-functional, to form an aqueous latex or suspension, followed by neutralisation with a base to effect water-solubilisation of the emulsion or suspension polymer thereof.

11. Method according to claim 1, wherein said oligomer is an olefinic oligomer in which molecular weight control has been achieved during the polymerisation process to make it by using a chain transfer agent selected from the group consisting of mercaptans, halohydrocarbons and α-methyl styrene.

12. Method according to claim 1 wherein said oligomer is unsaturated, said unsaturation being achieved by employing an unsaturated monomer as part of the monomer system used for making the oligomer, or by employing an unsaturated chain transfer agent, or by employing a cobalt chelate complex as a catalytic chain transfer agent.

13. Method according to claim 1 wherein said water-soluble oligomer is an olefinic polymer derived from a monomer system which comprises at least one member of the group consisting of olefinically unsaturated acid-bearing comonomer and olefinically unsaturated comonomer bearing a nonionic dispersing group and at least one olefinically unsaturated non-acid-functional, non nonionic dispersing functional, non-crosslinking comonomer.

14. Method according to claim 13 wherein said oligomer is acid-bearing, having acid-functional comonomer(s) comprising a carboxyl-functional comonomer(s) thereby to provide carboxyl-functional groups in the resulting oligomer.

15. Method according to claim 14 wherein the acid-functional comonomer(s) comprises at least one monomer selected from monocarboxyl-functional acrylic monomer(s), olefinically unsaturated dicarboxyl bearing monomer(s) and half esters thereof, and anhydrides thereof.

16. Method according to claim 13 wherein the non-acid-functional non nonionic dispersing functional, non crosslinking comonomer(s) comprises at least one monomer selected from alkyl and cycloalkyl methacrylates, alkyl and cycloalkyl acrylates, styrenes, vinyl esters, olefinically unsaturated halides and olefinically unsaturated nitriles.

17. Method according to claim 16 wherein said alkyl methacrylates are C1 to C12 alkyl methacrylates, said cycloalkyl methacrylates are C5–C12 cycloalkyl methacrylates, said alkyl acrylates are C1 to C12 alkyl acrylates, and said cycloalkyl acrylates are C5–C12 cycloalkyl acrylates.

18. Method according to claim 16 wherein said alkyl methacrylates are selected from methyl methacrylate, ethyl methacrylate and n-butyl methacrylate, said cycloalkyl methacrylates are selected from isobomyl methacrylate and cyclohexyl methacrylate, said alkyl acrylates are selected from methyl acrylate, ethyl acrylate, n-butyl acrylate, and 2-ethylhexyl acrylate, said cycloaklyl acrylates are selected from isobornyl acrylate and cyclohexyl acrylate, said styrenes are selected from styrene itself, α-methyl styrene and t-butyl styrene, said olefinically unsaturated nitriles are selected from methacrylonitrile and acrylonitrile, said olefinically unsaturated halides are selected from vinyl chloride, vinylidene chloride and vinyl fluoride and said vinyl esters are selected from vinyl acetate and vinyl alkanoates.

19. Method according to claim 13 wherein the monomer system for the oligomer comprises a functional monomer(s) for providing subsequent crosslinkability in the resulting polymer system (crosslinking monomer(s)).

20. Method according to claim 19 wherein said crosslinking monomer(s) provides groups selected from ketonic or aldehydic carbonyl groups, epoxy groups, acetoacetyl groups, hydroxy groups, amino groups, alkoxysilane groups and double bond groups.

21. Method according to claim 20 wherein said crosslinking monomer(s) is selected from allyl, epoxy and hydroxyalkyl methacrylates and acrylates and acetoacetoxy esters thereof, dienes, keto and aldehyde functional monomer(s).

22. Method according to claim 13 wherein said olefinic oligomer is an acid functional oligomer derived from a monomer system comprising 5 to 10 weight % of acid-bearing comonomer(s), 0 to 40 weight % of crosslinking monomer(s); and 10 to 95 weight % of non acid functional, non nonionic functional, non-crosslinking comonomer(s).

23. Method according to claim 22 wherein said non acid functional, non nonionic dispersing functional, non-crosslinking comonomer(s) is selected from one or more of methyl methacrylate, styrene, ethyl acrylate, n-butyl methacrylate, 2-ethyl hexyl acrylate and n-butyl acrylate while the acid monomer is selected from methacrylic acid and/or acrylic acid.

24. Method according to claim 22 wherein said oligomer is derived from a monomer system comprising 5 to 30 weight % methacrylic acid and/or acrylic acid, 0 to 40 weight % of diacetone acrylamide and/or aceto acetoxy ethyl methacrylate, 10 to 70 weight % methyl methacrylate, 10 to 70 weight % of n-butyl acrylate, 0 to 40 weight % of one or more of ethyl acrylate, 2-ethylhexyl acrylate and n-butyl methacrylate, and 0 to 40 weight % styrene.

25. Method according to claim 1 wherein said water-soluble oligomer is an acid group-bearing polyester.

26. Method according to claim 25 wherein said acid groups are carboxylic acid and/or sulphonic acid groups, which groups render or assist in rendering the polyester water-soluble either per se and/or when in neutralized form as acid anion salt groups.

27. Method according to claim 26 wherein sulphonate anion groups are present in the polyester oligomer by employing as an acid component in the polyester synthesis an acid component of formula

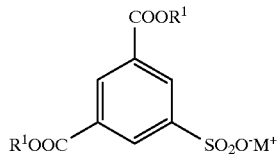

where M is sodium, lithium or potassium and $R^1$ is H or lower alkyl of 1 to 5 carbon atoms.

28. Method according to claim 27 wherein said acid component is sodio-5-sulphoisophthalic acid (SSIPA).

29. Method according to claim 25 wherein carboxylic acid groups are present in the polyester oligomer in fully or partially neutralized form.

30. Method according to claim 25 wherein said polyester oligomer has hydrophilic polyethylene oxide chains incorporated therein.

31. Method according to claim 25 wherein said polyester oligomer is wholly or predominantly sulphonate stabilized and has a sulphonate ion group content within the range of from 7.5 to 100 milliequivalents of sulphonate groups per 100 g of polyester.

32. Method according to claim 25 wherein said oligomer has functional groups for imparting subsequently crosslinkability, preferably at least hydroxyl groups.

33. Method according to claim 25 wherein the polyester oligomer has unsaturation incorporated therein.

34. Method according to claim 1 wherein said polyester oligomer has a number average molecular weight within the range of from 500 to 50,000 g/mol.

35. Method according to claim 1 wherein said latex polymer(s) is hydrophobic and the monomer system used for the preparation of said latex polymer(s) comprises at least one monomer selected from styrenes, alkyl and cycloalkyl acrylates, alkyl and cycloalkyl methacrylates, vinyl esters, olefinically unsaturated halides, and olefinically unsaturated nitriles.

36. Method according to claim 35 wherein said monomer system comprises at least one of styrene, $C_{1-12}$-alkyl and $C_{5-12}$ cycloalkyl methacrylate(s) and $C_{1-12}$-alkyl and $C_{5-12}$-cycloakyl acrylate(s).

37. Method according to claim 35 wherein part of the monomer system used in the preparation of the hydrophobic polymer comprises a functional monomer(s) for providing groups for imparting subsequent crosslinkability in the polymer system, such groups being selected from ketonic or aldehydic carbonyl groups, epoxy groups, acetoacetyl groups, hydroxy groups, amino groups, alkoxysilane groups and double bond groups.

38. Method according to claim 35 wherein said monomer system comprises an acid functional monomer(s) at a level of below 10 wt % selected from methacrylic acid and/or acrylic acid.

39. Method according to claim 35 wherein said hydrophobic latex polymer is made from a monomer system which comprises at least one of styrene, $C_{1-10}$-alkyl methacrylates, $C_{3-10}$-alkyl acrylates, optionally methacrylic and/or acrylic acid, and optionally diacetone acrylamide and/or acetoacetoxy ethyl methacrylate.

40. Method according to claim 1 wherein the number average molecular weight (Mn) of the latex polymer is $\geq 5,000$ g/mol higher than the Mn of the oligomer.

41. Method according to claim 1 wherein said at least one free radically-polymerisable monomer is selected from methyl methacrylate, n-butyl acrylate, n-butyl methacrylate, methyl acrylate, ethyl acrylate, 2-ethylhexyl acrylate, α-methyl styrene, methacrylonitrile, acrylonitrile, vinyl chloride and vinylidene chloride.

42. Method according to claim 1 wherein the amount of said at least one free-radically polymerisable monomer which is employed for the polymerisation is within the range of from 0.1 to 10% by weight, based on the weight of the oligomer(s) plus polymer(s).

43. Aqueous polymer latex composition comprising a water-soluble oligomer(s) grafted to a latex polymer(s) wherein said grafting has been effected by the method according to claim 1.

44. Aqueous composition according to claim 43 which has a solids content within the range of from 10 to 70 wt % on a total weight basis.

45. Aqueous composition according to claim 43 wherein the relative amounts of the oligomer and polymer are such that the wt % of the oligomer, based on the wt of the oligomer plus polymer, is within the range of 5 to 70 wt %.

46. Aqueous composition according to claim 43 which comprises other additives or components.

47. Aqueous composition according to claim 43 wherein said oligomer(s) and said latex polymer(s) bear coreactive functional groups for imparting crosslinkability.

48. Aqueous composition according to claim 43 wherein said oligomer(s) and optionally said latex polymer(s) bear functional groups for imparting crosslinkability, and said composition also comprises a crosslinking agent reactable with said functional groups on coating formation to effect crosslinking.

49. Aqueous composition according to claim 48 wherein said oligomer(s) and optionally said latex polymer(s) bear isocyanate-reactive groups, and said composition also comprises an aqueous-dispersed organic polyisocyanate.

50. A member of the group consisting of films, polishes, varnishes, lacquers, paints, inks and adhesives derived from an aqueous composition according to claim 1.

51. Method according to claim 4 wherein said nonionic dispersing groups comprise polyethylene oxide chains.

52. Method according to claim 42 wherein the amount of said free-radically polymerizable monomer is 0.1 to 5% by weight of the weight of the oligomer(s) and polymer(s).

53. Aqueous composition according to claim 49 wherein the isocyanate-reactive groups are hydroxyl groups.

54. Method according to claim 1 wherein said oligomer is an olefinic oligomer in which molecular weight control has been achieved during the polymerisation process to make it by using a transition metal complex in a catalytic chain transfer polymerisation process.

55. Method according to claim 13 wherein said member is a polyethylene glycol acrylate or methacrylate.

56. Method according to claim 15 wherein said monomer is selected from the group consisting of methacrylic acid, preferably selected from methacrylic acid, acrylic acid, itaconic acid, fumaric acid and maleic anhydride.

57. Method according to claim 25 wherein said crosslinking monomer(s) is selected from allyl methacrylate, allyl acrylate, acrolein, 1,3-butadiene, isoprene, methacrolein, vinyl methyl ketone, glycidyl methacrylate and acrylate, hydroxyethyl methacrylate and acrylate, hydroxy propyl meethacrylate and acrylate, and acetoacetoxyesters thereof, and keto-containing amides.

58. Method according to claim 21 wherein said monomer system comprises 10 to 30 weight % of said bearing components; 0–10 weight % of crosslinking monomesr; and 60 to 90 weight % of non acid functional, non nonionic functional non-crosslinking comomer.

* * * * *